SAMMIE F RITTER INVENTOR.

FIG 4B

United States Patent Office 3,281,775
Patented Oct. 25, 1966

3,281,775
AUTOMATED SYSTEM FOR THE SERIAL FORMAT RECORDING AND PARALLEL FORMAT TRANSCRIBING OF REPETITIVE SEISMIC SIGNALS
Sammie F. Ritter, Dallas, Tex., assignor to Mobil Oil Corporation, a corporation of New York
Filed Aug. 29, 1963, Ser. No. 305,344
16 Claims. (Cl. 340—15.5)

This invention relates to seismic exploration and more particularly to exploration wherein seismic pulses are generated periodically as an exploring system is moved along a traverse and the resultant signals are recorded serially in reproducible form and following termination of recording are reproduced for the production of a seismic record section.

In seismic exploration, particularly in marine areas, it has been found desirable to move an exploring system along a preselected course with a seismic source and one or more seismic detectors maintained in a predetermined spaced relationship with respect to one another. Periodic actuation of the source results in the production of a family of seismic signals. In accordance with copending application Serial No. 86,035, filed January 31, 1961, now Patent No. 3,219,968, which issued November 23, 1965, for Method and System for Recording Repetitive Seismic Signals by George B. Loper and Frank J. McDonal, coworkers of applicant, the seismic signals are recorded serially on one track of a two-track tape. On a second track are recorded timing lines and superimposed thereon oral instructions to a playback operator, which instructions are concerned primarily with the geographical location of the field instrumentation at a particular instant. All instructions are later detected during playback; and a playback operator will, at an appropriate time, mark the seismic section being produced in order visually to indicate a geographical marker. The timing lines are employed to drive the seismic section recording drum in synchronism with a two-track playback system.

It is an object of the present invention to provide on the timing track a unique signal other than words of instruction which are detected automatically to mark on the seismic section some representation of a geographical marker and thereby obviate the constant attendance by a playback operator.

It is a further object of the present invention to provide a unique condition between adjacent, serially recorded, seismic traces which will be useful in initially synchronizing the operation of the playback system with the seismic section recording system.

More particularly, and in accordance with the present invention, there is provided an arrangement for seismic exploration which comprises a source and detector of seismic waves which are moved in predetermined spaced relation along a traverse. The seismic source is periodically actuated to generate seismic waves successively along the traverse. Seismic signals resulting from each actuation of the source are detected and recorded serially in reproducible form on a two-track tape. Between each of the seismic traces, that is, between the time break of one and the termination of another, there is provided a null segment which, in a preferred embodiment, is produced by resetting the programed gain control of an amplifier associated with the field recording system. In the playback mode, there is provided means responsive to the aforesaid null segment between adjacent seismic signal traces on the two-track tape for stopping the two-track playback device at the beginning of a tape. The two-track playback device is then restarted when a specific rotational position has been attained by a seismic section recording means.

In the playback system, the recording device, which may be a "Modulite" galvanometer, is mounted on a carriage which is stepped a predetermined distance in direction transverse of a recording medium each time the recording drum of the seismic section recorder makes one complete rotation. In accordance with the present invention, the means for stepping the carriage is made responsive to a tone of frequency different from that of the timing-line frequency to double step the carriage and thus to provide a blank vertical space on the seismic section which provides an indication of a geographical marker.

For a more complete understanding of the present invention and for further objects and advantages thereof, reference may now be had to the following description taken in conjunction with the accompanying drawings in which.

Figure 1:
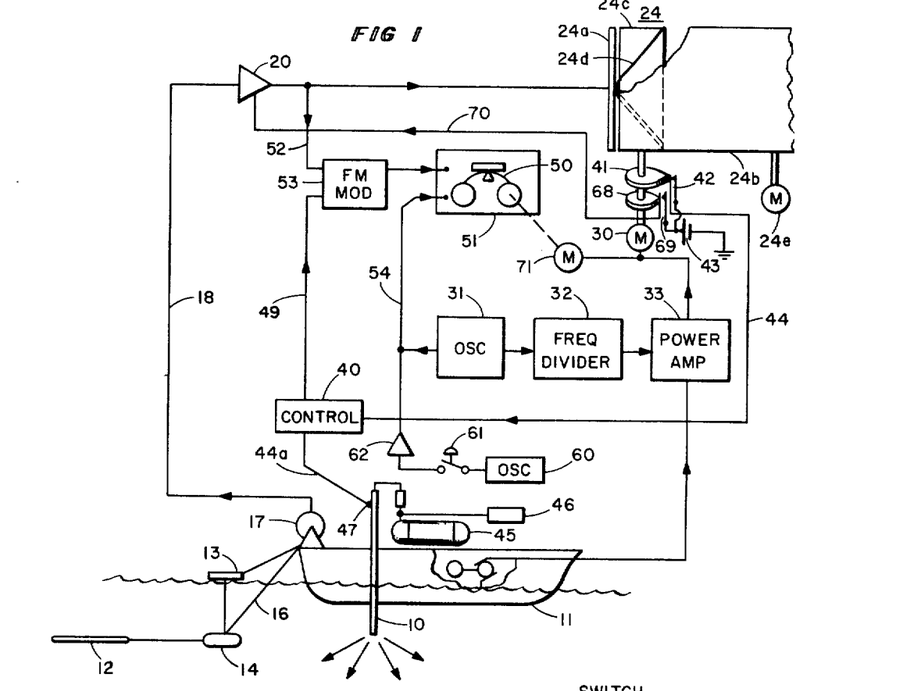
FIGURE 1 represents in block form a marine exploring system embodying features of the present invention.

Referring now to FIGURE 1, there is illustrated a seismic source 10 mounted on a boat 11 and adapted to produce pulses of seismic energy periodically which travel downwardly to subsurface reflecting interfaces and thence back to a seismic detector 12. Detector 12 is shown in the form of an elongated streamer and may be of the type disclosed in U.S. Patent No. 2,923,916 to John H. Woodworth, a coworker of applicant. Detector 12 is towed behind boat 11 and is maintained at a predetermined known depth by a surface vane 13 coupled to a diving vane 14, both of which are mechanically connected to boat 11 so that they can be towed along a given traverse. A cable 16 extends from detector 12 to a reel 17 mounted on boat 11. A signal channel 18 from the detector 12 extends from reel 17 to the input of an amplifier 20. Seismic signals are then applied from the amplifier 20 to a recorder unit 24.

The signals may be applied to the recorder unit 24 by way of a compositor (not shown) which may be of a delay drum type for adding the seismic signals prior to recording on the recorder 24. The seismic signals, whether composited or not, are applied to a recording bar 24a for impressing upon a chart 24b a representation of the intensity of the seismic signals. The recording may conveniently be accomplished through the use of a rotating drum 24c which carries a spiral 24d thereon. A signal potential applied to the bar 24a causes an electric current to pass through chart 24b to the spiral 24d to register an impression upon the chart of variations in the magnitude of the electrical signal.

The drum 24c is driven by a motor 30 at a rate which is controlled from a master oscillator 31. More particularly, oscillator 31 in one embodiment of the invention has a carefully controlled output frequency of 1000 cycles per second. The output of the oscillator 31 is applied to a frequency divider 32 to reduce the frequency to 62.5 cycles per second. The latter signal is then applied to a power amplifier 33 whose output in turn is connected to motor 30. By this means, oscillator 31 of controlled frequency characteristics is employed to drive the synchronous motor 30 at a precise rate so that the exact time relationships of components of electrical signals at the output of the amplifier 20 appear on the chart 24b. The chart 24b is driven past the recording bar 24a by a suitable chart drive motor 24e.

The rotation of the drum 24c controls the firing of the source 10. This is accomplished by way of a control unit 40. More particularly, a cam 41 mounted on the shaft leading between motor 30 and the drum 24c serves to close switch 42 periodically to apply an actuating signal from a suitable source, such as battery 43, to the control unit 40 by way of channel 44. The control unit 40 is connected by way of channel 44a to the source 10.

In the systems illustrated, source 10 is an elongated tubular element into the top of which is fed a combustible gas mixture, such as propane, derived from a tank 45 mounted on boat 11 and air derived from an air compressor 46, also mounted on the boat. The muzzle of source 10 extends to a point below the water's surface. The combustible gas mixture in practice is fed continuously into the top of the elongated tube forming the source 10. Application by way of channel 44a of periodic, high-voltage pulses from control unit 40 to a spark plug 47 serves to ignite the combustible gas mixture. The resultant expansion of gases produces a sharp, relatively low-frequency, acoustic impulse on the surface of the water at the muzzle of the source 10, thereby producing seismic waves. Thus, under control of oscillator 31, the source 10 produces periodic acoustic waves or pulses of acoustic energy. The pulses preferably are generated at the rate of about one every six seconds, and the drum 24c completes one revolution in such time interval. The signals recorded on chart 24b will therefore represent electrical signals received by detector 12 in each six-second interval between successive acoustic impulses from source 10.

The seismic signals received by detector 12 are also recorded serially without compositing on tape 50 of a tape recorder 51. More particularly, the output of amplifier 20 is connected by way of channel 52 to an FM modulator 53. The output of modulator 53 is applied to a first input terminal of the recorder 51. The recorder 51 preferably is a high-fidelity system having a capacity of at least two channels so that the family of seismic signals from the detector 12 may be recorded serially on one of the channels, or tracks. On the second of the channels, or tracks, there is recorded a timing signal which is derived from oscillator 31 and applied to the second input by way of channel 54.

Time break signals are added to the information applied to the FM modulator. The time break signal, which is an impulse corresponding with the instant of generation of each acoustic pulse by the source 10, is generated by the control unit 40 and applied to the FM modulator 53 by way of channel 49. Accordingly, there is recorded on the first track, or channel, of the recorder 51 an impulse corresponding with the instant of generation of each acoustic pulse by source 10 in its real time position relative to the components of the seismic waves detected by the detector 12.

In accordance with the present invention, there is further provided means for recording on the tape 50 a unique signal which will be useful with respect to the location of the exploring system on a given traverse and otherwise provide for an on-the-spot storage of information necessary to the interpretation of the signals recorded on the tape. For this purpose, an oscillator 60 is connected as by way of switch 61 and amplifier 62 to channel 54 so that a signal of frequency different from that of the timing-line frequency may be recorded on the tape 50 and ordinarily super-imposed upon the timing-line signals from the oscillator 31. In accordance with the present invention, this unique signal will automatically be detected and employed in one embodiment to automatically step a section writer so that the information regarding the geographical location of the exploring system will be represented by a blank vertical space on the seismic section.

Figure 3:
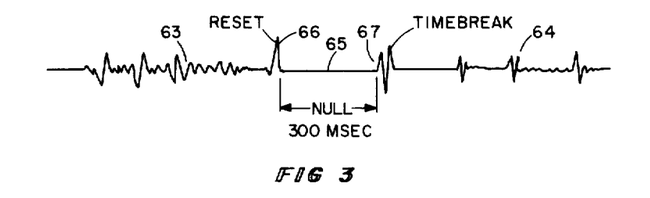
FIGURE 3 illustrates adjacent seismic traces as they would appear on the magnetic field tape and showing a nulled portion between the end of one trace and the beginning of another trace.

Further, in accordance with the present invention, another unique signal is placed on the other track of the tape 50, the track upon which seismic information is being recorded. This unique signal will be useful in later initially synchronizing the operation of a playback system and a section recorder. More particularly, the unique signal, or function, will take the form of a dead spot, or null, on the track between the end of one seismic trace and the beginning of a second seismic trace. A typical representation of the relationship between the aforementioned seismic traces is illustrated in FIGURE 3 wherein the reference character 63 identifies one trace, and the reference character 64 represents a later arriving trace. The null portion referred to is represented by reference character 65, and it occurs between a reset pulse 66 and the time break pulse 67. In one preferred embodiment, the null portion exists for a period of approximately 300 milliseconds.

The null portion or unique signal 65 is added between adjacent seismic traces in the following manner. Cam 68 (FIGURE 1), which is a few degrees advanced of cam 41, closes switch 69 each time the drum 24c makes one complete rotation. The closure of switch 69 applies a pulse from battery 43 by way of channel 70 to the amplifying system 20. The amplifying system includes a programed gain control which responds to the pulse and resets itself to a start position where the gain level is very low. This renders the system substantially nonresponsive to any low-level signals or noise and thus creates the null or signal-free portion 65 on the seismic information track of tape 50.

The tape 50 of recorder 51 is driven by way of synchronous motor 71. In order that the recording medium 50 be accurately controlled as to speed so that the position of the seismic signals from the detector 12 will represent the real time occurrence, the motor 71 is energized from the power amplifier 33 which, as aforesaid, controls by way of the frequency of its output the cyclic operation of the exploring system.

It will now be understood that the system of the type illustrated in FIGURE 1 will be employed as the boat 11 is moved along a predetermined traverse. Magnetic tape of the order of one-half to three hours or more in length may be employed on the recorder 51 to permit the boat 11 to cover a substantial sector of a given traverse before tape replacement is necessary. The tapes thus produced by the operation set forth in connection with FIGURE 1 may then be shipped to a location convenient for processing by a system illustrated in FIGURE 2.

Figure 2:
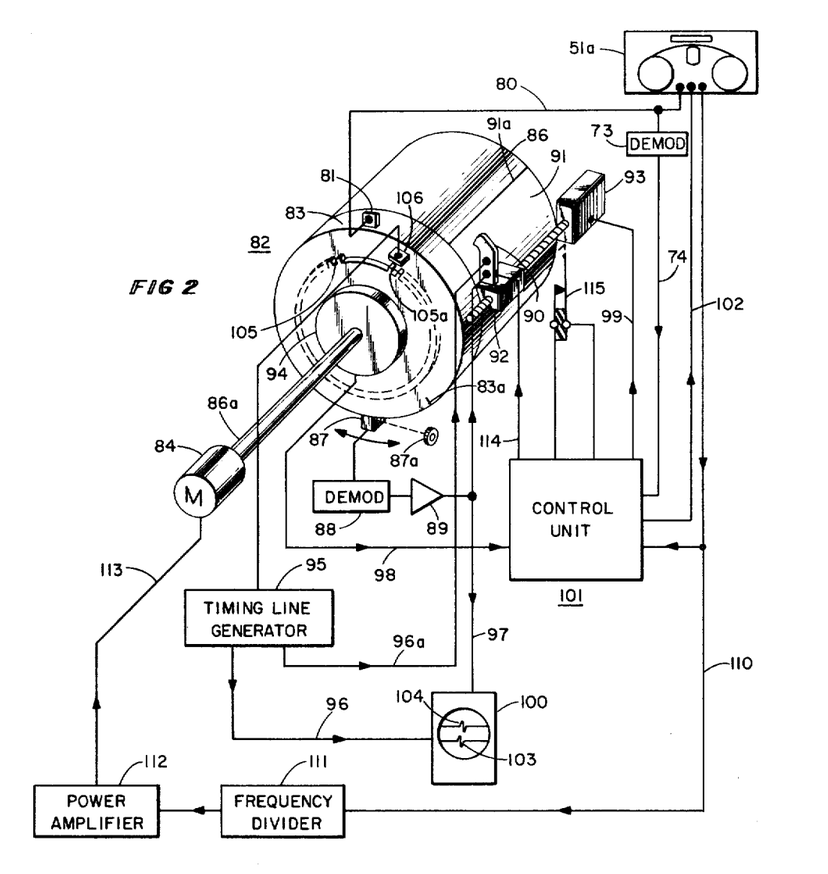
FIGURE 2 presents in block form a playback and re-recording system embodying further features of the present invention.

The system of FIGURE 2 embodies further features of the present invention which provide, after initial synchronization, for automatically recording, compositing and writing a seismic section which includes geographical markings without attention on the part of an operator. The system also includes automatic stop functions. The stopping functions are provided by the section writer. It has a capacity for approximately 72 minutes of recording. When capacity has been reached, the section writer initiates a function which also automatically stops the playback recorder.

A block schematic of the overall playback system is illustrated in FIGURE 2. It includes the tape deck playback system 51a for the quarter-inch tape, having a first output electrically connected by way of channel 80 to a record head 81 on a section writer 82. While only one record head is illustrated and will be described in conjunction with the present invention, it will be understood that in the actual system now in use there are fourteen record heads so that compositing may take place of the seismic information recorded serially on the quarter-inch tape of the unit 51a. As many as fourteen traces can be composited at one time and recorded photographically, magnetically, or in any other phonographically reproducible form. While the capability of the compositing system is fourteen traces, any combination of traces can be composited by operation of an appropriate selector switch.

The seismic information is recorded by record head 81 on a magnetic medium 83 carried by a drum 86 driven by motor 84 by way of a shaft 86a. The seismic information is picked up by a playback head 87 and applied by way of suitable demodulator 88 and amplifier 89 to a "Modulite" galvanometer 90 which directs a beam of light on photosensitive paper 91 carried on another section of the drum 86.

The "Modulite" galvanometer 90 is mounted on a carriage 92 which is moved transversely with respect to the recording paper 91 by any suitable stepping-type mechanism 93. The stepping mechanism can be a permanent magnet stepping motor available from Superior Electric Company and known as a "Slo-Syn" synchronous motor employed in conjunction with a translator which converts pulses to step functions of proper amplitude and duration for operation of the synchronous motor. The pulses applied to the translator are derived by way of a microswitch located in the enclosure 94 and actuated by a cam responsive to movement of the shaft 86a. A plurality of switches are contained within enclosure 94 and electrically connected to a control unit 101 by way of connections represented by channel 98. Each time the drum 86 makes one complete rotation, the microswitch is closed to generate a pulse which is applied from control unit 101 by channel 99 and is effective to cause the carriage 92, supporting the "Modulite" galvanometer 90, to step one unit distance transversely of the photographic paper 91.

In accordance with the present invention, whenever a tone signal, representative of a geographical marker, appears on the timing track, a second circuit is conditioned; and when the drum reaches a predetermined position, another microswitch closes to apply a pulse to the stepping mechanism 93 to cause the carriage 92 to be moved over another increment of distance. The second microswitch is located almost immediately behind the first microswitch so that the stepping pulses occur one right after the other. The stepping or movement of the carriage 92 takes place immediately before the writing of a new trace on the photographic paper 91.

The quarter-inch tape reel is mounted on the tape deck or playback system 51a, and a start switch (not shown) is closed to start the operation of the playback system 51a and the section writer 82. In order properly to prepare or write-out a section, it is necessary that the playback of the quarter-inch tape be initially synchronized with the section writer. To this end, there is provided an oscilloscope 100 to enable an operator visually to align time breaks 103 and 104.

In accordance with the present invention, the playback system 51a is arranged to come to a stop when the area 65 of zero signal called the null area (FIGURE 3) is under the playback head of system 51a. This is the area between the reset pulse 66, signifying the end of one seismic trace, and the time break pulse 67, signifying the beginning of the next trace. The output of the seismic trace including the null area is continuously applied to control unit 101 by way of demodulator 73 and channel 74. When the null area is detected, a control function is generated and applied to channel 102 to stop the playback system 51a.

While the playback system 51a is stopped, the drum 86 continues to rotate to close a switch contained in enclosure 94 at a time shortly after tape splice 83a has passed the recording head 81. The closure of the switch restarts the playback unit 51a by applying a control function from control unit 101 to system 51a by way of channel 102. The purpose of this operation is physically to place the time break from the playback system 51a on tape 83 at an approximately zero time position relative to the tape splice 83a and to the splice 91a on the photographic paper 91. With the time break from the playback unit 51a so recorded, it is now within the sweep range of the oscilloscope 100.

Upon continued operation of both systems, there will occur at the face of the oscilloscope 100 a pulse 103, signifying the occurrence of the time break 67 from the quarter-inch field tape, which is applied to the oscilloscope 100 by way of channel 97. A second pulse 104, signifying the zero time reference which is generated by the section writer 82, is applied to the oscilloscope 100 by way of timing-line generator 95 and channel 96. The time break from the section writer 82 is generated by a tone wheel 105 and more particularly by the first tooth 105a of the series of teeth comprising the tone wheel. The first tooth 105a is oriented with respect to the splice 91a on the photographic paper 91 so that it arrives under a magnectic reluctance pickup 106 shortly after the splice 91a in the photographic paper 91 has passed the galvanometer 90.

The playback operator observes the face of the oscilloscope and manually adjusts the position of the playback head 87 by way of knob 87a either to advance or to retard the occurrence of the pulse 103 in order to align even more accurately the time break pulse 103 with the zero timing line pulse 104. The sweep of oscilloscope 100 is triggered by the operation of a switch actuated at a time just prior to the arrival of the first tooth 105a under the pickup 106.

After the time breaks, or pulses, have been aligned and the systems are in synchronism, they will remain in synchronism by reason of the section writing drum 86 being driven by synchronous motor 84 at a speed controlled by timing pulses recorded on the field tape. The timing pulses, preferably of the order of 1000 cycles per second, are applied by way of channel 110 to a frequency divider 111 where they are stepped down to approximately 62.5 cycles per second. The output of the frequency divider is applied to a power amplifier 112 which is coupled to motor 84 by way of channel 113.

With the systems now in synchronism, a playback operator will wait until he receives a start signal which has been recorded on the field tape. This start signal will be a sustained tone of approximately several seconds' duration, signifying that the boat 11 has arrived at a geographical point representing the start of the traverse to be explored. Upon the sounding of the tone over a suitable loud speaker, the operator will depress a start button and from then on the system automatically will write out the section and insert where necessary, as by double step of the galvanometer carriage, geographical markers. These markers are usually placed approximately every 2000 feet of traverse. The entire system is stopped when the carriage 92 reaches a predetermined limit of travel. When the carriage 92 reaches the right-hand limit, switch 115 is actuated to interrupt power to the systems by way of control unit 101.

Timing lines may be applied to the recording medium 91. The timing lines are generated by the timing-line generator 95 in response to pulses from pickup 106 and applied to galvanometer 90 by way of channel 96a.

The lamp of galvanometer 90 is controlled by functions generated by control unit 101. At the end of each trace and during the time splice 91a is passing the galvanometer 90 the lamp is turned off by a function applied by way of channel 114. At all other times the lamp is on to write out the section.

Figure 4A:
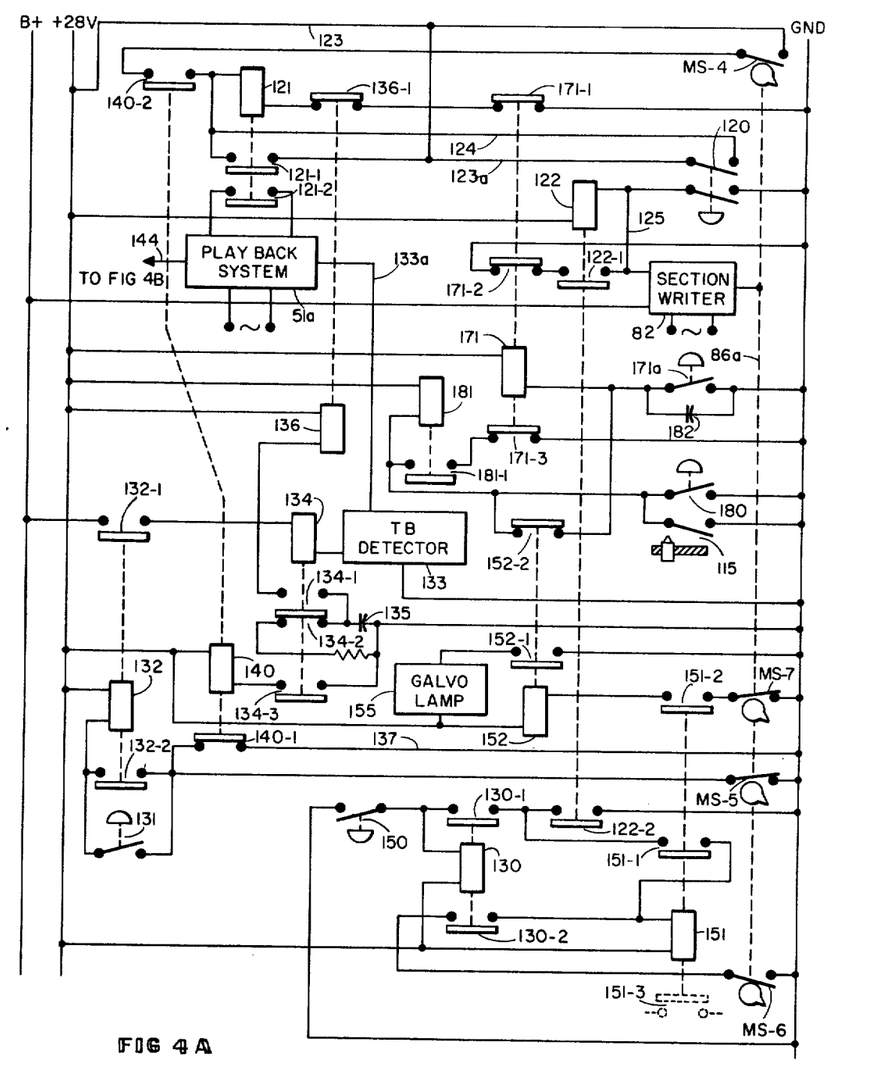
FIGURES 4A and 4B schematically illustrate circuit details of the control unit of FIGURE 2.
Figure 4B:
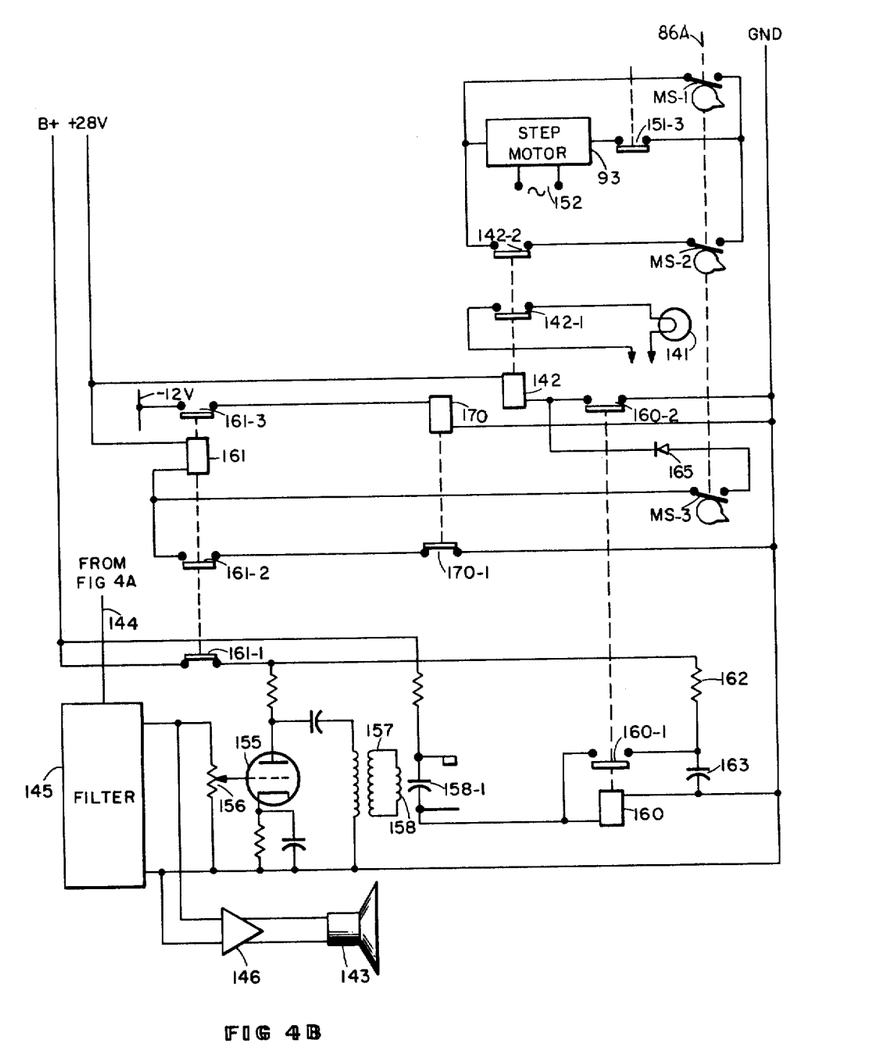

Details of the control unit 101 are illustrated in FIGURES 4A and 4B. The system is placed in operation by momentarily closing switch 120. The upper contacts of switch 120 complete a circuit to energize the driving motor and the playback preamplifiers in the playback recorder 51a. The closure of the lower contacts of switch 120 applies a momentary ground to the operating coil of relay 122 and to a power amplifier associated with the section writer 82 by way of conductor 125.

The closure of the upper contacts of switch 120 completes a circuit to energize relay 121, the energizing relay for playback system 51a. The circuit may be traced from the +28 volt supply, thence by way of conductors 123, 123a, switch 120, conductor 124, the operating coil of relay 121, closed relay contacts 136–1 and 171–1, and thence to ground. Relay contacts 121–2 are now closed to complete an energizing circuit for the playback system 51a, and relay 121 is maintained energized by closure of contacts 121–1.

Relay 122 closes its contacts to perform the following functions. The relay is held up or latched by closure of its contacts 122–1 to pick up a ground by way of closed relay contacts 171–2. This ground is now also applied to the power amplifier of power-driving amplifier for the section writing drum in lieu of the ground previously supplied by way of conductor 125. At the same time, the closure of contacts 122–2 of relay 122 conditions relay 130, a "write" relay, by applying a ground to the righthand terminal of contacts 130–1.

With the system now running, the operator depresses a "sync-trip" switch 131 which will be effective to set in motion a number of operations including the stopping of the playback recorder 51a when the null or mute portion of the tape is under the pickup head of that recorder and the restarting of the drive for the playback recorder 51a when the section writing drum 86 has rotated to a position where the null point on the tape will correspond with a predetermined distance from the tape splice, a distance related also to the splice in the photographic paper. The null point detector will be deactivated as soon as the playback system 51a is restarted and will remain in this state for the duration of writing a section.

The closure of the "sync-trip" switch 131 energizes relay 132 to apply B+ to null point or time break detector 133. The relay 132 is energized by picking up a ground connection by way of closed contacts 140–1 of relay 140. Relay 132 closes its contacts 132–1 to apply B+ by way of the operating coil of relay 134 to the plate circuit of a gas tube (not shown) included in time break or null point detector 133. At the same time, contacts 132–2 are closed to hold the relay 132 in an energized condition. With contacts 132–2 closed, the "sync-trip" switch 131 is now bypassed.

The signal appearing on the quarter-inch tape is picked up and applied to the input of the time break detector 133 by way of conductor 133a. Upon the appearance of the null section on the tape, the gas tube fires to energize relay 134 and to stop the drive mechanism of the playback system 51a in the following manner. Upon energization of the relay 134, its contacts 134–1 are closed to apply a ground by way of a large capacitor 135 to one side of the operating coil of relay 136. The relay 136, by reason of the capacitor in series circuit, operates but momentarily— but for a time adequate to interrupt the drive control circuit of the playback system 51a. This is accomplished by opening contacts 136–1 to interrupt the ground connection to relay 121 to bring the playback drive to an almost instantaneous halt. The playback system is now stopped with the null point under the pickup head while the section writing transport continues to rotate.

Relay 140 is energized by closure of contacts 134–3 of relay 134 to open the ground circuit connected to relay 132 by way of conductor 137. More particularly, relay contacts 140–1 are opened. However, the relay 132 is still maintained energized by reason of an auxiliary ground picked up by way of the normally closed switch MS–5. But now relay 132 is under control of switch MS–5. Relay 140 also closes its contacts 140–2 to condition a circuit to restart the playback tape transport upon the closure of normally open switch MS–4. Now, when the switch MS–4 closes, a circuit is completed to restart the playback tape transport and both the playback transport and the section writing transport are very close to synchronization. Both time break pulses 103, 104 (FIGURE 2) will be visible on the face of oscilloscope 100; and by adjustment of playback head 87, the systems are brought into exact synchronization.

Figure 5:
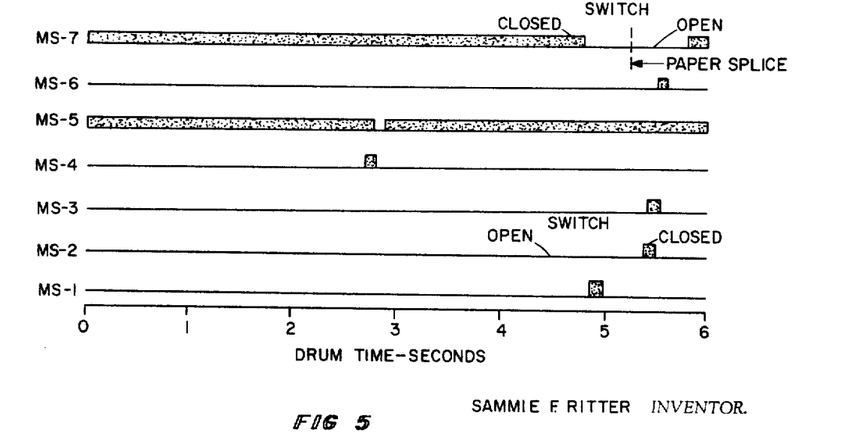
FIGURE 5 is a chart of the time sequence operation of switching devices illustrated in FIGURES 4A and 4B.

Once relay 140 has been actuated, the system is made nonresponsive to further null portions on the field tape. More particularly, soon after switch MS–4 closes to start the tape transport of system 51a, switch MS–5 (normally closed) is opened. (See the time sequence operation of switches in FIGURE 5). A ground connection is removed from relay 132 and its contacts 132–1 open. As a result, B+ is removed from the detector 133 and the detector is effectively made nonresponsive to all further occurring null portions on the field tape until such time as it is necessary to resynchronize the two tape transport mechanisms. This normaly will occur only when reels of quarter-inch tape are being changed or when the paper is changed on the section writing drum.

It will be recalled that when the start switch 120 was closed to energize relay 122, it conditioned the "write" relay 130 for operation by applying a ground to the righthand terminal of contacts 130–1. Now, with the system in synchronism, the system is ready to write. The operator will wait until he receives an indication that the boat 11 has arrived at the starting point for the traverse to be explored. This indication may be provided by a lamp 141 (FIGURE 4B) which will be illuminated upon energization of the relay 142 as by closure of contacts 142–1. The relay 142 is energized whenever a 240-cycle tone, representative of a geographical marker, appears on the field tape. In the alternative, or together therewith, there may be provided a loud speaker 143 which will sound the 240-cycle tone. The 240-cycle tone is applied to the speaker from the playback system 51a, conductor 144, 240-cycle notch filter 145, and amplifier 146.

Upon receipt of the indication, the operator momentarily will close switch 150 (FIGURE 4A) to start the system 82 writing. The closure of switch 150 applies a ground to one side of the operating coil of relay 130. Contacts 130–1 close to complete a hold circuit for relay 130. Contacts 130–2 of relay 130 are also closed in order to close a circuit between one side of switch MS–6 and one end of the operating coil of relay 151. Switch MS–6 will be closed after the splice 91a (FIGURE 2) in the photographic paper has passed the Modulite galvanometer to apply ground to one side of relay 151 to energize it. The relay 151 is latched by closure of its contacts 151–1. The closure of contacts 151–2 of relay 151 now connects one end of the operating coil of relay 152 to the switch MS–7. Switch MS–7 (normally closed) is effective to apply a ground to the operating coil of relay 152 to cause several functions to begin, including the energization of the galvanometer lamp 155, the energization of the timing-line galvanometer light (not shown), and to modify the manual stop and automatic stop features, which latter functions will be described hereinafter.

The switch MS–7 is provided so that the lamp of galvanometer 90 is turned off while the splice 91a is passing the galvanometer 90. The time duration of the operation of switch MS–7 is illustrated in the accompanying microswitch operation chart of FIGURE 5 which shows the switch MS–7 in an open-circuit condition at the time the splice is passing the galvanometer.

When the switch MS–7 closes, ground is now applied to the operating coil of relay 152 to close contacts 152–1 and to energize the lamp 155 of the Modulite galvanometer 90.

The operation of the relay 151 effects the completion of additional circuits and thus conditions the system for operations to step the carriage 92 for each trace and to double step the carriage to place a geographical marker on the photographic paper. More particularly, relay contacts 151–3 are closed to prepare the stepping motor 93 (FIGURE 4B) for response to the closure of cam-operated switch MS-1 for writing a new trace or to the closure of cam-operated switch MS-2 and closure of relay contacts 142-2 to provide a geographical marker.

With relay contacts 151-3 closed, the section writing system is prepared to step or double step the Modulite galvanometer carriage 92 (FIGURE 2) as required. The carriage 92 is stepped each time the section writing drum 86 makes one rotation and is double stepped each time a geographical position tone appears on the field tape. Each time the drum 86 begins a new rotation, the switch MS-1 is closed to apply a pulse to the translator of the step motor 93. The circuit is completed from one side of a source of power 152, the motor 93, relay contacts 151-3, switch MS-1, and thence to the other side of the supply 152.

When a tone, representing the location of the boat 11 at a specified geographical location, appears on the timing track of the field tape, a cam-operated switch MS-2 is effective to produce a second pulse to be applied to the translator subsequent to the pulse applied by reason of the operation of the first switch MS-1 to cause the step motor 93 to step a second time. This will cause a gap, or space, to appear on the section being written and will readily indicate to an interpreter the presence of a geographical marker. An examination of the time sequence chart of FIGURE 5 reveals that switches MS-1 and MS-2 are closed each time the section writing drum 86 makes a complete rotation. This occurs every six seconds. However, switch MS-2 is effective to apply a pulse to motor 93 only when relay contacts 142-2, in series therewith, are closed.

Relay contacts 142-2 close each time relay 142 is energized by a series of operations which begins with the appearance on the field tape of a unique signal. The unique signal representing the geographical information is selected as a 240.2-cycle tone which modulates the 1000-cycle signal on the timing track. The 240.2-cycle signal is applied together with the 1000-cycle timing signal to the input of the notch filter 145 which passes only signals of about 240.2 cycles. The 240.2-cycle tone is now applied to the input of an amplifier stage 155 by way of a potentiometer 156. The amplified signal is applied by way of coupling transformer 157 to a reed relay 158 which resonates at 240.2 cycles, plus or minus 1 cycle. The operation of the reed relay 158 causes its contacts 158-1 to vibrate, applying B+ to relay 160.

Relay 160 is latched by closure of its contacts 160-1 which apply B+ by way of closed contacts 161-1 of relay 161 and resistor 162 to the operating coil of the relay 160. Capacitor 163 provides for slow release of relay 160 when B+ is later interrupted.

Relay 142 is energized by closure of relay contacts 160-2 to close contacts 142-1 to light the indicator lamp 141 and to close contacts 142-2 to condition the step motor 93 for response to the closure of switch MS-2 in the manner above described.

The sequence of events then in order to place a geographical mark on the seismic section is the closure of switch MS-1 soon followed by the closure of switch MS-2, the latter being effective to apply a pulse to the motor 93 by reason of the energization of relay 142. Provision is made so that only one geographical-marker pulse, that is, a second skip or movement of the carriage 92, will be made despite the fact the tone may persist over a period of time overlapping two shots. More particularly, there is provided the relay 161, the energization of which will remove the B+ from the anode of the amplifier stage 155, thus to disable the tone detector for a predetermined period of time. In one embodiment, the time period was selected to be ten seconds. The B+ is removed in the following manner. Following the actuation of switch MS-2, another switch, MS-3, is closed by rotation of the drum to complete a circuit applying a ground to one end of the operating coil of relay 161. The ground is obtained through the switch MS-3, diode 165, and the contacts 160-2 of relay 160. Once energized, the relay 161 is then latched by picking up a second ground by way of its contacts 161-2 and the contacts 170-1 of relay 170. Relay contacts 161-1 are opened to interrupt B+ to amplifier stage 155. The amplifier will remain in a cut-off state for a period determined by relay 170. The relay 170 is a thermal relay; more particularly, Amperite Relay 12C10, a 10-second relay. The relay will operate ten seconds following the application of a potential or operating current to its operating coil. A −12 volt potential is applied to the relay 170 by way of the closed contacts 161-3 of relay 161. After a period of ten seconds, the relay 170 is energized to open its contacts 170-1 and remove the ground connection from the operating coil of relay 161. Relay 161 is deenergized to close its contacts 161-1 and once more apply B+ to the amplifier stage 155 and thereby reset the detector system for response to another geographical-marker tone.

A counter (not shown) may be provided to check the total number of geographical marks appearing on a seismic section. The total number may then be related to a record previously made in the field of the number of marks which the operator has placed on the field tape. The counter may be energized in response to actuation of relay 161.

Any one of three conditions will bring the entire system to a stop. One involves an emergency stop, initiated by an operator, in which event the entire system will shut down immediately. The second includes an automatic stop, initiated by an operator for the purpose of changing reels of tape. The automatic stop will shut the system down only after the paper splice has reached a position just beyond the galvanometer. The third mode of stopping is one controlled by the limit of movement of the carriage of the section writing instrument.

The emergency stop is effected by closing switch 171a (FIGURE 4A) to energize relay 171 by applying a ground to one side of the operating coil of that relay. The operation of relay 171 interrupts the ground connection to relay 121 of the playback system, and the playback system immediately stops. More particularly, relay contacts 171-1 are opened to remove the ground from the operating coil of relay 121. At the same time, relay contacts 171-2 are opened to remove the ground from relay 122 and from the section writer 82 immediately to stop the drum 86. When relay 122 is deenergized by opening of contacts 171-2, contacts 122-2 in the latch circuit of relay 130 are opened. Relay 130 is deenergized, and the galvanometer lamp 155 is also turned off by deenergization in turn of relays 151 and 152.

The second mode of stopping the instrument is automatic in that the system will come to a stop after initiation of a signal only when the drum 86 reaches a predetermined angular position. This system operates as follows. When the operator depresses switch 180, a ground is applied to one end of the operating coil of relay 181 to energize that relay and to close its hold contacts 181-1. The relay 181 is held up by picking up a ground by way of closed contacts 171-3 of relay 171. Now, when the paper splice approaches the galvanometer, switch MS-7 is opened to remove the ground from relay 152. With relay 152 deenergized, its contacts 152-2 are closed to complete a circuit to apply a ground to energize stop relay 171. The entire system is now brought to an immediate stop in a manner previously described.

A 20-microfarad capacitor 182 shunting the switch 171a is provided to continue an effective ground connection to the operating coil of relay 171 after relay contacts 152-2 have closed to be certain that the system has responded and the relay 171 will operate for a long enough duration to provide for action to be taken by the circuits under its control. It will be observed that relay 171 obtained its ground through a circuit including its own contacts 171–3, contacts 181–1 of relay 181, and contacts 152–2 of relay 152. This ground connection immediately is lost when relay 171 begins to pull in. The capacitor 182 is provided to prevent oscillation of the system and in the following manner. The capacitor 182 is normally charged. As soon as the ground connection is completed as by closing relay contacts 152–2, the capacitor immediately discharges. Now, in its discharge state, it provides an effective closed circuit between ground and the operating coil of relay 171. This connection will be maintained until the capacitor 182 is substantially charged. The time constant for charging is arranged such as to assure that the system has come to a complete stop, whereupon the relay 171 will once again be deenergized.

The system is also stopped by limit switches that are located at the right and at the left limit of travel of the galvanometer carriage. For simplicity, only one switch, the limit switch 115, has been illustrated. The switch 115, being in parallel with switch 180, sets into motion the same series of operations above described with respect to switch 180. Briefly, when the limit switch 115 is closed, a ground immediately is applied to one side of the operating coil of relay 181 to energize that relay. As the section writing drum 86 again brings the paper splice opposite the galvanometer, switch MS–7 will open the ground connection to relay 152 to energize relay 171 in the manner above described to bring the system to an immediate stop.

Figure 6:
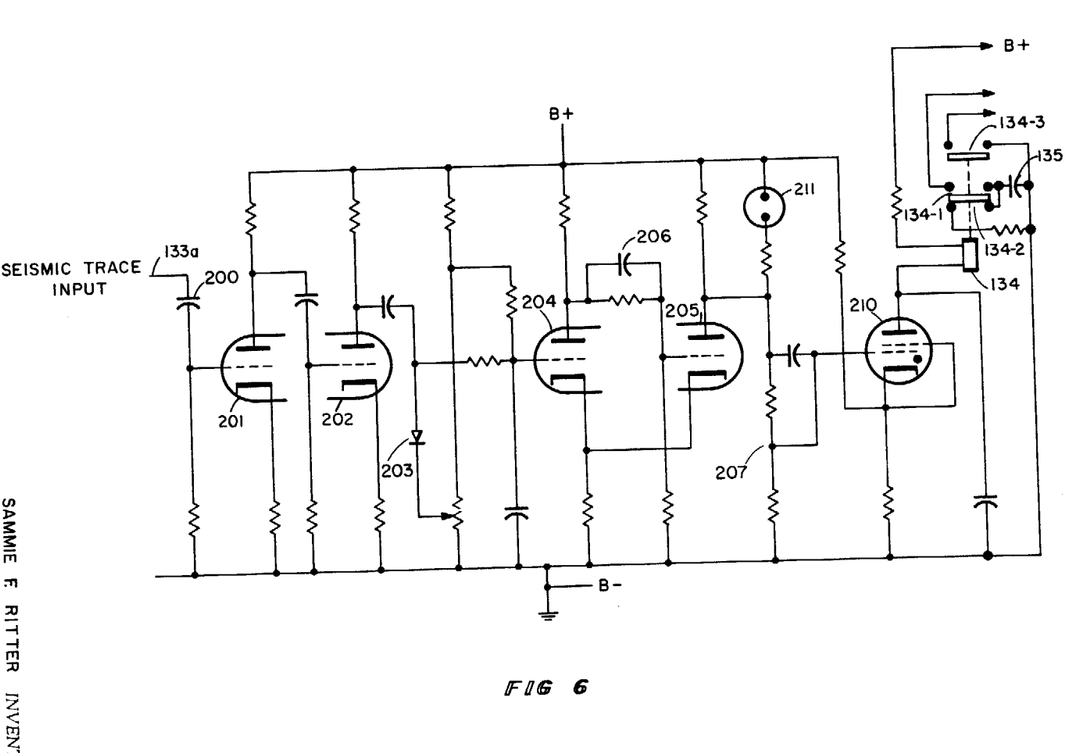
FIGURE 6 is a circuit schematic of a preferred means for detecting the presence on the field tape of a tone representing a geographical marker.

Whenever the system is brought to an emergency stop as by closing switch 171a, it may be necessary thereafter to resynchronize the operation of the playback system 51a and the section writer 82. It will be recalled that such synchronization involves the time break or null detector 133. While a number of different devices may be employed to carry out the function of the time break detector, there is illustrated in FIGURE 6 a preferred arrangement for detecting the null portion 65 (FIGURE 3) which exists between adjacent seismic traces and between the reset pulse 66 and the time break pulse 67. It will be further recalled that the relay 134 is rendered operative whenever the null portion 65 appears under the pickup head of the playback system 51a to set in motion a series of operations which includes the stopping of the playback system 51a. Relay 134 is illustrated again in FIGURE 6 and is shown connected in series between a B+ supply and the anode of a gas tube 210. The gas tube 210 is normally held biased at cutoff. When the null portion 65 is detected, the grid of the tube 210 is made more positive and the tube conducts. As a result of current flow through the operating coil of relay 134, the relay is energized to close its contacts 134–1 and 134–3 to perform the functions described above in conjunction with the circuits illustrated in FIGURE 4A.

The bias for normally holding the tube 210 at cutoff is developed in the following way. The input signal from the seismic trace is applied by way of conductor 133a and coupling capacitor 200 to the input of a first amplifier stage 201. The first amplifier stage 201 is coupled to the input of a second amplifier stage 202 whose output is half-wave rectified by rectifier 203. With connections as shown, only the negative-going portions of the output of stage 202 are applied to the input of amplifier stage 204. The developed potential is adequate to maintain the stage 204 at cutoff. As a result, the potential at the anode of the stage 204 is very close to B+. Accordingly, a high positive potential is coupled by way of the network 206 to the input of a final amplifying stage 205. Stage 205 is conducting and therefore the potential developed across the voltage divider 207 is relatively low. This potential applied to the control grid of the gas tube 210 is lower than the potential applied to the cathode of the tube 210 and therefore the tube is held at cutoff. Now, upon the arrival of the null portion 65, the bias is removed from the amplifying stage 204 and it conducts. As a result, the stage 205 is now driven to cutoff and the potential at the voltage divider 207 increases to a level to overcome the potential applied to the cathode of the tube 210 and the tube fires.

Neon tube 211 is provided to indicate the status of the time break detector 133. The neon lamp 211 is on during the time the gas tube 210 is at cutoff and provides an indication to the operator that the detector 133 is in a ready state for sync operation.

Now that a preferred embodiment of the present invention has been fully described, it will be understood that modifications may be made and certain parts may be used in place of other parts all within the scope of the appended claims.

What is claimed is:

1. In an exploring system in which seismic pulses are generated repetitively at predetermined, uniform time intervals and at spaced points along a traverse and in which resultant seismic waves are detected in the interval between successive pulses for recording, the combination which comprises:
    (a) means for storing signals representative of said seismic waves serially on a magnetic recording medium thereby to record a family of signals representative of layering of reflecting interfaces beneath said traverse,
    (b) means for generating a constant-frequency timing signal having a frequency which is high compared with the repetition rate of said seismic pulses.
    (c) means for storing said timing signal on said medium separately from said family of signals, and
    (d) means for superimposing at random times on said timing signal a second signal of substantially constant frequency different from the frequency of said timing signal for storage on said magnetic medium of information identifying the location of the exploring system along the traverse.

2. The exploring system of claim 1 including means for providing on said magnetic recording medium prior to the generation of each seismic pulse a unique signal at points between successive ones of said signals representative of said seismic waves for indicating the proximity of the time break representing the time occurrence of generation of said seismic pulses.

3. The exploring system of claim 2 in which said unique-signal providing means includes means for providing a null segment on said magnetic recording medium.

4. In an exploring system in which seismic pulses are generated repetitively at predetermined, uniform time intervals and at spaced points along a traverse and in which resultant seismic waves are detected in the interval between successive pulses for recording, the combination which comprises:
    (a) means for storing signals representative of said seismic waves serially on a magnetic recording medium thereby to record a family of signals representative of layering of reflecting interfaces beneath said traverse,
    (b) means for generating a constant-frequency timing signal having a frequency which is high compared with the repetition rate of said seismic pulses,
    (c) means for storing said timing signal on said medium separately from said family of signals, and
    (d) means for providing on said magnetic recording medium prior to the generation of each seismic pulse a unique signal at points between successive ones of said signals representative of said seismic waves for indicating the proximity of the time break representing the time occurrence of generation of said seismic pulses.

5. In an exploring system in which seismic pulses are generated repetitively at predetermined, uniform time intervals of about six seconds and at spaced points along a traverse and in which resultant seismic waves are detected in the interval between successive pulses for recording, the combination which comprises:

(a) means for storing signals representative of said seismic waves serially on a magnetic recording medium thereby to record a family of signals representative of layering of reflecting interfaces beneath said traverse, (b) means for generating a constant-frequency timing signal having a frequency of about 1000 cycles per second, (c) means for storing said timing signal on said medium separately from said family of signals, and (d) means for superimposing at random times on said timing signal a second signal of substantially constant frequency of about 240 cycles per second for storage on said magnetic medium of information identifying the location of the exploring system along the traverse.

6. In an exploring system in which seismic pulses are generated repetitively at predetermined, uniform time intervals and at spaced points along a traverse and in which resultant seismic waves are detected in the interval between successive pulses for recording, the combination which comprises:

(a) means for storing signals representative of said seismic waves serially on a magnetic recording medium thereby to record a family of signals representative of layering of reflecting interfaces beneath said traverse, (b) means for generating a constant-frequency timing signal having a frequency which is high compared with the repetition rate of said seismic pulses, (c) means for storing said timing signal on said medium separately from said family of signals, (d) means for providing on said magnetic recording medium prior to the generation of each seismic pulse a unique signal at times between successive ones of said signals representative of said seismic waves for indicating the proximity of the time break representing the time occurrence of generation of said seismic pulses, (e) playback means for reproducing from said medium said seismic signals, said timing signal, and said unique signals, (f) means coupled to the output of said playback means and responsive to said seismic signals for recording in side-by-side relation a visual representation of the seismic signals, (g) means coupled to the output of said playback means and responsive to said timing signal for driving said side-by-side recording means at a speed synchronous with the speed of said playback means, (h) means coupled to the output of said playback means and responsive to one of said unique signals for stopping said playback means, and (i) means responsive to a specific rotational position of said side-by-side recording means for restarting said playback means thereby to record the time break on succeeding seismic signals at a selected zero reference position on said visual representation.

7. In an exploring system in which seismic pulses are generated repetitively at predetermined, uniform time intervals and at spaced points along a traverse and in which resultant seismic waves are detected in the interval between successive pulses for recording, the combination which comprises:

(a) means for storing signals representative of said seismic waves serially on a first track of a magnetic recording medium thereby to record a family of signals representative of layering of reflecting interfaces beneath said traverse, (b) means for generating a constant-frequency timing signal having a frequency which is high compared with the repetition rate of said seismic pulses, (c) means for storing said timing signal on a second track of said medium separately from said family of signals, (d) means for superimposing on said timing signal a unique-marker signal of substantially constant frequency for storage on said second track of said magnetic medium of geographical information identifying the location of the exploring system along the traverse, (e) a two-track playback means for reproducing said tracks of said medium and having a first-track output and a second-track output, (f) a drum for supporting a recording medium, (g) a carriage movable along the axis of said drum, (h) means mounted on said carriage and coupled to said first-track output for recording in side-by-side relation a visual representation of the seismic signals on the medium, (i) means responsive to a predetermined rotational position of said drum for stepping said carriage an incremental distance along the axis of said drum, (j) means coupled to said second-track output and responsive to said timing signal for driving said drum at a speed synchronous with the speed of said two-track playback means, and (k) means coupled to said second-track output and responsive to said unique-marker signals for stepping said carriage a second incremental distance after said first stepping means has operated to provide a mark on the recording medium representative of geographical locations.

8. A playback recording system for producing in side-by-side relation a representation of seismic signals originally recorded on magnetic field tape in serial form, the magnetic field tape also including a timing signal and unique signals on each portion of the tape prior to a time break associated with each of the seismic signals, said playback system comprising:

(a) a playback means for reproducing from said tape said seismic signals, said timing signal, and said unique signals, (b) means coupled to the output of said playback means and responsive to said seismic signals for recording in side-by-side relation a visual representation of the seismic signals, (c) means coupled to the output of said playback means and responsive to the said timing signal for driving said side-by-side recording means at a speed synchronous with the speed of said playback means, (d) means coupled to the output of said playback means and responsive to one of said unique signals for stopping said playback means, and (e) means responsive to a specific rotational position of said side-by-side recording means for restarting said playback means thereby to record the time break on succeeding seismic signals at a selected zero reference position on said visual representation.

9. A playback recording system as in claim 8 in which said playback means includes a stop circuit and in which said means responsive to one of said unique signals comprises:

(a) a switch connected in circuit with said stop circuit, (b) means coupled to the output of said playback means and responsive to said seismic signals for producing a bias normally to maintain said switch inoperative, and (c) means coupled to the output of said playback means for sensing one of said unique signals for overcoming said bias to operate said switch to operate said stop circuit to stop said playback means.

10. A playback recording system as in claim 9 in which said switch comprises:

(a) a gas tube including at least an anode, a cathode, and a control grid, (b) means coupled to the output of said playback means and responsive to said seismic signals for applying a first bias to said cathode for maintaining said tube at cut-off, (c) means coupled to the output of said playback means for generating a second bias in response to one of said unique signals on said tape prior to a time break for overcoming said first bias and to cause said tube to conduct, and (d) a relay having contacts in circuit with said stop circuit and having an operating coil connected in series with the anode of said tube and responsive to current flow as a result of tube conduction for operating the stop circuit of said playback means.

11. A playback recording system as in claim 8 including means in circuit with said unique-signal responsive means and under operational control of a specific rotational position of said side-by-side recording means for rendering said unique-signal responsive means nonresponsive to other unique signals once the playback means has been restarted.

12. A playback recording system for producing in side-by-side relation a representation of seismic traces originally recorded on a first track of a magnetic field tape in serial form, the magnetic field tape also including on a second track a timing signal and unique signals representative of geographical locations of field instrumentation at a point of interest superimposed on the timing signal, said playback system comprising:

(a) a two-track playback means for reproducing said field tape and having a first-track output and a second-track output,
(b) a drum for supporting a recording medium,
(c) a carriage movable along the axis of said drum,
(d) means mounted on said carriage and coupled to said first-track output for recording in side-by-side relation a visual representation of the seismic signals on the medium,
(e) means responsive to a predetermined rotational position of said drum for stepping said carriage an incremental distance along the axis of said drum,
(f) means coupled to said second-track output and responsive to said timing signal for driving said drum at a speed synchronous with the speed of said two-track playback means, and
(g) means coupled to said second-track output and responsive to said unique signals for stepping said carriage a second incremental distance, after said first-mentioned stepping means has operated, to provide a mark on the recording medium representative of geographical locations.

13. A playback recording system as in claim 12 wherein said unique signals are constant-frequency tone signals and in which said means responsive to said unique signals includes:

(a) means coupled to said second-track output for detecting said tone signals in the presence of said timing signal,
(b) a relay for conditioning said stepping means for operation when said relay is energized,
(c) means responsive to the detected tone signal for energizing said relay, and
(d) a switch in circuit with said relay and said stepping means and responsive to a predetermined rotational position of said drum to energize said stepping means to produce an indication of a geographical marker on the seismic section recording.

14. A playback recording system as in claim 13, including also:

(a) memory means for storing the existence of said detected tone signal, and
(b) erase means responsive to a specific rotational position of said drum for erasing the existence of said detected tone signal from said memory means after said carriage has been stepped to provide a geographical mark.

15. A playback recording system as in claim 14 including a hold circuit to disable said tone-detecting means for a predetermined period of time to avoid a false stepping of the carriage in the event the tone persists over a period preceding and succeeding the first and second stepping operations of said carriage, said hold circuit being responsive to said erase means.

16. A playback recording system as in claim 12 in which said side-by-side recording means includes:

a lamp, and
a galvanometer electrically connected to said first-track output and optically coupled to said lamp for directing a light beam onto said recording medium, and in which said system includes:

means responsive to a predetermined rotational position of said drum for conditioning said lamp for operation.

References Cited by the Examiner

UNITED STATES PATENTS

| | | | |
|---|---|---|---|
| 2,929,669 | 3/1960 | Madeley et al. | 181—.5 X |
| 2,976,107 | 3/1961 | Klein et al. | 340—15.5 X |
| 3,153,771 | 10/1964 | Anstey et al. | 340—15.5 |
| 3,187,336 | 6/1965 | Montgomery | 340—15.5 |
| 3,210,770 | 10/1965 | Woods et al. | 346—33 |

BENJAMIN A. BORCHELT, *Primary Examiner.*

R. M. SKOLNIK, *Assistant Examiner.*